US012118742B2

(12) United States Patent
Pérez Cortés et al.

(10) Patent No.: US 12,118,742 B2
(45) Date of Patent: Oct. 15, 2024

(54) METHOD AND SYSTEM FOR THE CALIBRATION OF AN OBJECT RECONSTRUCTION DEVICE

(71) Applicant: INSTITUTO TECNOLÓGICO DE INFORMÁTICA, Valencia (ES)

(72) Inventors: Juan Carlos Pérez Cortés, Valencia (ES); Alberto José Pérez Jiménez, Valencia (ES); Jose Luis Guardiola García, Valencia (ES)

(73) Assignee: INSTITUTO TECNOLÓGICO DE INFORMÁTICA (ES)

( * ) Notice: Subject to any disclaimer, the term of this patent is extended or adjusted under 35 U.S.C. 154(b) by 347 days.

(21) Appl. No.: 17/620,521

(22) PCT Filed: Jun. 16, 2020

(86) PCT No.: PCT/EP2020/066634
§ 371 (c)(1),
(2) Date: Dec. 17, 2021

(87) PCT Pub. No.: WO2020/254327
PCT Pub. Date: Dec. 24, 2020

(65) Prior Publication Data
US 2022/0327727 A1 Oct. 13, 2022

(30) Foreign Application Priority Data
Jun. 18, 2019 (EP) ..................................... 19382507

(51) Int. Cl.
*G06T 7/70* (2017.01)
*G06T 7/60* (2017.01)
(Continued)

(52) U.S. Cl.
CPC .................. *G06T 7/70* (2017.01); *G06T 7/60* (2013.01); *G06T 7/80* (2017.01); *H04N 23/90* (2023.01)

(58) Field of Classification Search
CPC .... G06T 7/70; G06T 7/60; G06T 7/80; G06T 7/85; H04N 23/90; H04N 17/002
See application file for complete search history.

(56) References Cited

U.S. PATENT DOCUMENTS

2020/0208966 A1* 7/2020 Pérez Cortés .......... B07C 5/366

FOREIGN PATENT DOCUMENTS

| EP | 2511653 A1 | 10/2012 |
|---|---|---|
| EP | 2940653 A1 | 11/2015 |

(Continued)

OTHER PUBLICATIONS

Perez-Cortes JC, Perez AJ, Saez-Barona S, Guardiola JL, Salvador I. A System for In-Line 3D Inspection without Hidden Surfaces. Sensors (Basel). Sep. 7, 2018;18(9):2993. doi: 10.3390/s18092993. PMID: 30205498; PMCID: PMC6165387. (Year: 2018).*

(Continued)

*Primary Examiner* — Nancy Bitar
*Assistant Examiner* — Heath E. Wells
(74) *Attorney, Agent, or Firm* — Lerner David LLP

(57) ABSTRACT

The present invention relates to a method and system for the optical and geometric calibration of a device configured for reconstructing the three-dimensional shape of an object. The object is reconstructed from a set of images thereof acquired by a plurality of cameras, where said plurality of cameras must necessarily be calibrated so that reconstruction is carried out without errors. In the context of the invention, calibration consists of obtaining the extrinsic parameters of said plurality of cameras; that is, the positions of their optical centers and the spatial orientations of their optical axes.

17 Claims, 6 Drawing Sheets

(51) Int. Cl.
  *G06T 7/80* (2017.01)
  *H04N 23/90* (2023.01)

(56) References Cited

FOREIGN PATENT DOCUMENTS

EP       3418675 A1    12/2018
WO   WO-2019157486 A1 *  8/2019   ............. A61B 5/004

OTHER PUBLICATIONS

International Search Report for PCT/EP2020/066634 dated Sep. 10, 2020. 2 pgs.
Hartley, R.I.; Zisserman, "A. Multiple View Geometry in Computer Vision", 2nd ed.; Cambridge University: New York, NY, USA, 2004. 16 pgs.
Faugeras, O. "Three-Dimensional Computer Vision: A Geometric Viewpoint"; MIT: London, UK, 1993. 70 pgs.
Tsai, R.Y. "A versatile camera calibration technique for high accuracy 3D machine vision metrology using off-the-shelf TV cameras and lenses". IEEE, J. Robot. Autom. 1987, RA-3, 323-344, XP002633633, DOI: 10.1109/JRA.1987.1087109. 22 pgs.

* cited by examiner

METHOD AND SYSTEM FOR THE CALIBRATION OF AN OBJECT RECONSTRUCTION DEVICE

CROSS-REFERENCE TO RELATED APPLICATIONS

The present application is a national phase entry under 35 U.S.C. § 371 of International Application No. PCT/EP2020/066634 filed Jun. 16, 2020, which claims priority from European Patent Application No. 19382507.2 filed Jun. 18, 2019, all of which are incorporated herein by reference.

OBJECT OF THE INVENTION

The present invention relates to a method and system for the optical and geometric calibration of a device configured for reconstructing the three-dimensional shape of an object. The object is reconstructed from a set of images thereof acquired by a plurality of cameras, where said plurality of cameras must necessarily be calibrated so that reconstruction is carried out without errors. In the context of the invention, calibration consists of obtaining the extrinsic parameters of said plurality of cameras; that is, the positions of their optical centers and the spatial orientations of their optical axe.

BACKGROUND OF THE INVENTION

A calibration process allows maintaining and verifying proper device operation, i.e., calibration assures the reliability and traceability of measurements taken by said device.

In the context of the invention, the shape of an object is reconstructed from images thereof acquired by a plurality of cameras. The object to be reconstructed is positioned by means of the free fall thereof, like in the case of patent EP2511653, or by means of impulsion, like in the case of patent P13925EP00, or by means of the placement thereof by any other means in the volume of the space visible to the cameras.

It is also known apparatus like the one disclosed in the patent application EP2940653A1 comprising a plurality of cameras for producing a 3D figurine wherein a plurality of images of a subject are received, captured using different cameras.

To carry out error-free reconstruction, it is essential to find a geometric reference frame that is common for all the cameras of the reconstruction device; in particular, it is necessary to know accurately their optical centers (spatial position of each camera) and their orientations (focus direction of each camera).

The terms sensor and camera will be differentiated throughout the description. Sensor is understood to be the sensitive light-receiving matrix which is capable of generating a two-dimensional pixel image according to the light captured by each sensitive individual element of the matrix. Typical parameters of a sensor are spatial resolution measured in pixels per unit of width and height of the sensor.

Camera is understood to be the assembly formed by at least one sensor and an optical unit formed by at least one lens or equivalent device which allows focusing an image on the sensor. The camera is characterized by the position of a reference point of the sensor, preferably a central point of the sensitive matrix, and by the orientation thereof coinciding with the optical axis of the optical unit configured for focusing the image on said sensor. Typical parameters of a camera are focal length, the luminosity of its optic (maximum aperture), and the size and resolution of its sensor. Another important parameter, determined by the chosen aperture, the focal length, and the size of its sensor, is the depth of field, i.e., the volume of the space captured by the camera which is projected crisply focused on the sensor.

Throughout this document, the term "to photograph" or "to perform an image capture" will be used interchangeably, with both actions being understood as equivalent. All these terms must be interpreted as the acquisition of a two-dimensional image formed by pixels through the sensor of a camera determined through its optical unit according to its extrinsic parameters.

The two extrinsic parameters of the cameras may go out of adjustment due to many factors; e.g. due to precision tolerances of the assembly of the device, the aging of its components, or the mechanical stress it withstands. Therefore, in order for the reconstruction of the shape of the photographed object to be considered valid, it is necessary to know with certain regularity the possible variations the optical centers and the orientations of the cameras have undergone by means of a calibration process. The extrinsic parameters obtained after calibration allow defining a transformation between the actual three-dimensional space and the two-dimensional coordinate systems of the photographs captured by the cameras.

Calibration allows determining characteristics of the photographs which would be captured if there were no errors in the extrinsic parameters of the cameras or also modifying the extrinsic parameters to reduce or minimize the errors of such parameters.

There are several papers addressing the calibration of systems of this type:
  Hartley, R. I.; Zisserman, A. Multiple View Geometry in Computer Vision, $2^{nd}$ ed.; Cambridge University: New York, NY, USA, 2004.
  Faugeras, O. Three-Dimensional Computer Vision: A Geometric Viewpoint; MIT: London, U K, 1993.
  Tsai, R. Y. A versatile camera calibration technique for high accuracy 3D machine vision metrology using off-the-shelf TV cameras and lenses. IEEE J. Robot. Autom. 1987, RA-3, 323-344.

These papers describe the conventional method consisting of calibration of pairs or small sets of sensors (cameras in the context of the invention) which share visible elements marked in a specific physical object for calibration or in a scene. The physical objects have visual reference marks. These marks are expensive to make with the required precision and they call for a specific process of placement in the visual space of the sensors and locating of the reference marks.

The physical arrangement of the cameras of the reconstruction device to be calibrated, in the context of the invention, does not allow defining common reference points simultaneously visible to all the cameras. For example, if a physical object with points or other marked designs on its surface is used, a small set of cameras will be able to capture said reference marks but, due to the actual spatial distribution of the cameras, these marks will remain hidden for the rest of the cameras of the device.

Calibration by pairs or sets of cameras which share visible elements may be part of a chain calculation until all the cameras are calibrated. A camera is thereby locally calibrated with its neighbors which are in turn calibrated with their neighbors and finally with all the rest in an indirect manner.

The result of this method shows in practice precision and stability problems since errors may accumulate along the computing chain. In particular, the local calibration problems of each camera in chains arise essentially from the accumulation of small inconsistencies in the coordinate systems of each camera with respect to its closest neighbors.

In order to reconstruct an object three-dimensionally, a very high accuracy is required in the estimation of the extrinsic calibration parameters, so the aforementioned methods are not effective.

The present invention proposes a solution to the aforementioned problems by means of a method and system for the calibration of reconstruction devices, preventing the accumulation of calibration errors and the need for a physical object with reference marks.

DESCRIPTION OF THE INVENTION

The present invention proposes a solution to the preceding problems by means of a method for calibrating object reconstruction devices, a calibration system, a computer program, and a computer-readable medium. Preferred embodiments of the invention are defined in the dependent claims.

A first inventive aspect provides a computer-implemented method for calibrating an object reconstruction device, wherein the device comprises:
  a) a plurality of C cameras adapted for image acquisition, the j-th camera being identified as $Cam_j$ for all j=1 ... C, comprising:
    a sensor with a sensitive area formed by pixels for capturing an image, and
    an optic, with an optical axis with orientation vector $\vec{O}_J$ for establishing the focus on the sensor and the portion of the space projected on the sensor, and
  said cameras being spatially distributed in positions of a closed surface defining an observation region therein, where the cameras are configured for having the orientation vectors $\vec{O}_J$ of their optical axes oriented towards a pre-established point of the observation region;
  b) a calibration solid comprising a number NB of balls, with NB greater than or equal to one, the k-th ball being identified as $BL_k$ for all k=1 ... NB and wherein if two or ore balls are used they have different diameters;
  c) at least one positioning mechanism of the calibration solid configured for positioning said calibration solid in the observation region;
  d) a computational equipment in communication with the at least one positioning mechanism and with the plurality of cameras and configured for:
    causing in the plurality of cameras the capture of images of the observation region when the at least one positioning mechanism positions the calibration solid in said observation region, and
    receiving the images acquired by the plurality of cameras.

The reconstruction device to be calibrated comprises means which allow reconstructing an object three-dimensionally. This reconstruction is carried out from a set of images of the object taken simultaneously by the cameras of the device, where it is essential to calibrate said cameras so that reconstruction can be carried out without errors.

Throughout this document, index f identifies a specific camera of the plurality of cameras, notwithstanding the fact that this notation may be modified.

Each of the cameras is configured for acquiring at least one image of an object and comprises a sensor and an optic.

The sensor must be understood to be the electronic element which detects and captures information making up the image, and the optic the set of lenses of the camera which allows, on one hand, establishing the focus on the sensor, and on the other hand, defining which portion of the space is to be projected thereon. The optic comprises an optical axis with an orientation vector which establishes the focus on the sensor. Throughout the entire document, vector will be understood to be a mathematical element representing a segment oriented in space and is characterized by its modulus, direction, and sense. In the context of the invention, it will be understood that vectors determining the orientation of the optic are oriented unit vectors such that they depart from the sensor towards the scene to be photographed.

The cameras are spatially arranged forming a closed fictitious surface defining an observation region therein. When the object to be reconstructed is positioned in said observation region, the cameras remain positioned around same, which enables photographing said object from multiple angles and positions. The closed surface is said to be fictitious because it does not have to be formed by a physical enclosure. The shape of the surface is usually determined at the moment of spatially distributing the cameras given that the cameras are distributed on said surface. A common shape of the surface is a sphere or a regular polyhedron.

The optical axes of the cameras converge at a point within the observation region; i.e., the orientation vectors of the optical axes of the cameras are oriented towards a specific point of convergence of the observation region. In preferred examples, the observation region is a polyhedron or a spheroid and the point of convergence is the centroid of said polyhedron or spheroid. Spheroid is understood to be a sphere, or a sphere that is flattened along one or more axes. An example of spheroid is an ellipsoid of revolution.

To be able to calibrate the object reconstruction device, it is necessary for the cameras to acquire images with visual references that can be captured by the plurality of cameras and subsequently linked to one another. The invention uses a calibration solid. Calibration solid must be understood to be an object comprising at least one ball and not requiring the use of reference marks. When the calibration solid comprises two or more balls, all of them are physically connected by elements which assure known fixed distances between them. As a preferred example, the connecting elements between balls are rods. When the calibration solid comprises a plurality of balls, all the balls have a different diameter in order to distinguish each ball among the plurality. The at least one ball does not require the use of reference marks as a result of the features of the invention wherein the shape of the balls allows determining the location of the center of said balls, and the relative size or diameter allows to distinguish each ball among the plurality.

The ball or balls of the calibration solid must be elements that are visible for the plurality of cameras such that they can be identified in the three-dimensional space; that is, the depth of field of each of the cameras must be sufficient so as to cover the visible part of the calibration solid. In the context of the invention, the centers of the balls are used as calibration points, i.e., as reference points that are common to all the cameras which allow carrying out calibration thereof.

Throughout this document, index k identifies a specific ball of the calibration solid, notwithstanding the fact that this notation may be modified.

The calibration solid must be placed in the observation region to be photographed or captured by the cameras from different points of view. To that end, the reconstruction device comprises a positioning mechanism, which is understood to be means configured for placing an object in a specific position or positions within the observation region defined by the plurality of cameras. When the positioning mechanism positions the calibration solid in the observation region, each of the cameras has visual access to said calibration solid, and therefore all the cameras can capture an image thereof.

In order for the plurality of cameras to acquire images of the calibration solid when it is located in the observation region, the reconstruction device also comprises computational equipment, which is understood to be any processor or microprocessor with distributed or non-distributed data processing and analysis capacity. The computational equipment is configured for communicating with the positioning mechanism and the plurality of cameras, thereby achieving synchronization between both elements. The computational equipment activates the plurality of cameras causing them to simultaneously capture images of the observation region when the positioning mechanism positions the calibration solid in said observation region. Once the images have been acquired, they are sent by the plurality of cameras to the computational equipment for subsequent treatment.

The method of the first inventive aspect comprises the following steps:

1. a step of data capture of the object reconstruction device comprising the following sub-steps:

for each of the cameras $Cam_j$, providing their intrinsic parameters and estimated values of at least the following extrinsic calibration parameters:

orientation $\vec{O_j}$ in the observation region (R) within the closed surface and position of the optical center $c_j$ being also the point on the optical axis of the optics where all rays passing through it remain unrefracted;

establishing, based on the intrinsic and extrinsic parameters, a bijective correspondence $f_j$ between each coordinate of a pixel px of the image captured by the sensor of the camera $Cam_j$ and the set of coordinates of the points of the epipolar line r of the space, which passes through the optical center $c_j$ of the camera $Cam_1$ and are projected by the optic of the camera $Cam_1$ in that same pixel px after the image capture;

performing a predetermined number N of experiments, the i-th experiment being identified as $E_i$ for all i=1 ... N, according to the following sub-steps:

the positioning mechanism positioning the calibration solid in the observation region at a different position;

activating the plurality of cameras for each of them to capture an image of the calibration solid positioned in the observation region;

receiving the images $I_{ij}$ acquired by the cameras, where in each image $I_{ij}$ each of the balls $BL_k$ captured in the image is shown as connected regions $BP_k^{ij}$ of pixels, where index i with i=1 ... N denotes the experiment number, index j denotes the camera which has captured the image $I_{ij}$ with j=1 ... C, and k denotes the ball from among the balls of the calibration solid with k=1 ... NB, 2. a step of post-processing the captured data comprising the following sub-steps:

going through the set of captured images $I_{ij}$, where for each captured image $I_{ij}$ the following sub-steps are carried out:

identifying the connected regions $BP_k^{ij}$ of pixels corresponding to a specific ball $BL_k$ of the calibration solid, if it appears in the image $I_{ij}$;

for each connected region $BP_k^{ij}$ of a ball $BL_k$ of the calibration solid that does appear in an image $I_{ij}$, determining:

the pixel $px_{ijk}$ corresponding to the center of said connected region $BP_k^{ij}$ in the image $I_{ij}$; and in the space within the closed surface, determining the normalized direction vector $d_{ijk}$ of the epipolar line $r_{ijk}$ which corresponds to the pixel $px_{ijk}$ through the correspondence $f_j$;

determining the points of the space $p_{ik}'$ which minimize the summation of distances to the epipolar lines $r_{ijk}$ defined by the directions $d_{ijk}$ of each ball $BL_k$ in each experiment $E_i$:

$$p'_{ik} = \left[\sum_{j=1}^{c}[I - d_{ijk}d_{ijk}^T]\right]^{-1} \sum_{j=1}^{c}[I - d_{ijk}d_{ijk}^T]c_j$$

where I is the identity matrix and where T denotes the transposition of the vector $d_{ijk}$;

for each camera $Cam_j$, determining the extrinsic calibration parameters such that the correspondence $f_j$ between the epipolar line defined between the center $c_j$ and the point $p_{ik}'$, and the pixel $px_{ijk}$, for any experiment $E_i$ and for any ball $BL_k$ is satisfied.

To calibrate the cameras of the reconstruction device, the two major steps mentioned above must be performed: capturing data and post-processing said data. Each of said steps is divided into several sub-steps.

First, it is necessary to provide the intrinsic parameters of the cameras which must be understood to be the manufacturing parameters defining the internal geometry of the camera; therefore, these parameters are provided by the manufacturers or distributors of the cameras. Examples of intrinsic parameters are the focal length of the optical unit of the camera, possible geometric deformations introduced by said unit, maximum aperture, depth of field, size and resolution of the sensor, or relative position between the optic and the sensor.

Next, an estimation of the extrinsic parameters of the cameras, i.e., those that have to be accurately calculated with the calibration method, is provided. In particular, these parameters are the orientation of the optical axis of the camera in the inner space of the surface over which the cameras are distributed and the position of the optical center of the camera. Estimation must be understood to be the initialization value of the extrinsic parameters of each camera, i.e., an approximate value to be optimized by means of the calibration method. This value can always be determined given that an estimation corresponds to the target values which were established at the moment of assembling the capture device and they correspond to the design values of said device.

The method continues by establishing, based on the intrinsic and extrinsic parameters, a bijective correspondence between the coordinates of each pixel of the image and the epipolar lines of the space which are projected on each of these pixels.

Throughout this document, bijective correspondence or one-to-one correspondence must be understood to be a mathematical function characterized in that each input element corresponds to single output element. Line must be understood to be succession of points of the space that are aligned in one and the same direction and epipolar line or projection ray must be understood to be the line of points of the three-dimensional space which is projected in a specific pixel of the sensor of the camera through the optical unit thereof and passes through the optical center of said camera. There are two different ways of representing the projection of an image within a camera, a first case wherein the sensor of the camera is located between the optical center and the optical lens/lenses and a second case wherein the optical center is located between the sensor and the optical lens/lenses. The first configuration provides an image on the sensor having the same orientation than the real object and the second orientation provides an image on the sensor having an inverted orientation in respect to the orientation of the real object. Both cases are suitable for carrying out the invention; nonetheless, cameras use the second one.

This bijective correspondence is used in both directions. A point of the space that can be observed by a camera is projected on a pixel of the sensor according to a line, the line joining the point of the space and the pixel of the sensor passing through the optical center of the camera. The bijective correspondence establishes the correspondence between the line of said projection and the pixel of the sensor on which the point is projected and vice versa. That is, the correspondence also serves to link the pixel and any of the points of the plurality of points of the space defined by the same line.

The way of establishing this correspondence or the line equation can be done with different forms of mathematical expression, for example, at the moment of being implemented in a computer. Given that one and the same correspondence allows different forms of expression (some examples of possible expressions are: parametric expressions, by means of different algebraic expression modes for the line, or by means of the representation of the line by means of a vector and a point of the space), when the correspondence is established between the same pixel and the same line it is understood that all the possible expression modes are equivalent.

The method continues with the capture of images of the calibration solid. To that end, a predetermined number of experiments is performed, where each experiment must be understood to be the plurality of cameras capturing images anew after the calibration solid is positioned anew in the observation region.

Throughout this document, index i identifies a specific experiment, notwithstanding the fact that this notation may be modified.

For each experiment, the positioning mechanism positions the calibration solid in the observation region. In this instant, each camera of the plurality of cameras captures an image of the calibration solid such that it is photographed from different angles and positions, those established by the position and orientation of each camera. Each of the balls of the calibration solid is shown as a connected region of pixels in each image. When the balls are spherical, each set of pixels grouped in a substantially circular shape corresponds with one of the projected balls of the calibration solid. The identification of the balls which are visually accessible in a given image also allows identifying the position of the centers thereof in said image. Some embodiments of this specific step will be described below in the description of the detailed embodiments of the invention.

The computational equipment receives these images for processing. The processing step allows the computational equipment to estimate the calibration parameters of the cameras based on the received images. As mentioned above, this step also comprises a set of sub-steps.

First, for each experiment and for each camera, the connected regions corresponding to the projections of the balls of the calibration solid on the sensors of the cameras are identified in the images. Next, the pixels of the images representing the centers of said connected regions are determined. These pixels correspond with the projections of the physical centers of the balls of the calibration solid on the sensor of each particular camera and for each specific experiment.

Therefore, if the extrinsic parameters of each camera were ideal in the sense that they are error free, all the epipolar lines that are projected on the pixel of the sensor of each camera corresponding to the center of a specific connected region, $px_{ijk}$, would converge at a single point of the three-dimensional space; precisely, in the physical center of the ball represented by said connected region. It should be observed that, in order for this to happen, the connected region must represent the same ball of the calibration solid in each image of each camera and said images must be part of the same experiment.

In the context of the invention, the extrinsic parameters being ideal must be understood to mean that there are no inconsistencies or errors in the values thereof over time. However, in actual devices, the extrinsic parameters are not ideal but rather undergo temporary variations due to various factors. For example, due to precision tolerances of the assembly of the device, the aging of its components, or the mechanical stress it withstands.

Therefore, to calibrate the extrinsic parameters of the cameras, the method according to the invention assumes that 1) the epipolar lines do not have to converge at one point of the three-dimensional space, and 2) it is possible to determine a point of said three-dimensional space which minimizes the distance to all the epipolar lines.

Taking these two assumptions into account, the method according to the invention continues by calculating, for each experiment, the normalized direction vector of each epipolar line corresponding to the projected center of each ball. Normalized direction vector must be understood to be the unit vector indicating the direction and sense of the epipolar line passing through both the optical center of the camera and the pixel of the projected center of each ball. These vectors are calculated through the bijective correspondence defined above.

Based on these normalized vectors and on the previously estimated optical centers of the cameras, the point of the space which minimizes the summation of distances to the epipolar lines corresponding to the center of said ball is determined for each experiment and for each ball; i.e., the point which may be considered the point of the three-dimensional space that is the most likely to correspond with the center of each ball under study is estimated.

Finally, the extrinsic parameters of each camera are determined such that bijective correspondences between the epipolar lines (passing through the estimated optical center of the camera and the estimated points of the three-dimensional space) and the projected centers of the balls of the calibration solid are satisfied for all the experiments and in a manner that is as precise as possible.

Advantageously, the method of the invention does not require using complex calibration solids or costly manufacture. Furthermore, it is not necessary to use reference marks, which simplifies the method as a specific process for locating said reference marks is not required.

Even more advantageously, with the method of the invention calibration by pairs in a chain is not necessary, which prevents the propagation of individual calibration errors. This allows a very precise estimation of the extrinsic parameters, so errors when reconstructing the shapes of the objects are minimized.

It should be observed that the way of going through each of the indices in the definition of the method of the invention may be modified without altering the end result provided that all the images of all the cameras on which the ball or balls of the calibration solid have been projected are analyzed for each experiment.

In a particular embodiment, the number NB of balls of the calibration solid is greater than or equal to two and the balls are attached by rods.

When the calibration solid comprises more than one ball, more than one calibration point is obtained per experiment. In that sense, a larger amount of reference points on which the calibration is based is obtained for one and the same number of experiments. Advantageously, the times of the calibration method are reduced because, since fewer experiments have to be performed, the number of calibration solid positioning operations and the number of images to be analyzed are smaller.

An additional advantage is that the calibration solids with several balls offer greater variability of views in the captures.

In a preferred embodiment, the relative position of the balls of the calibration solid in space is random in each experiment.

In another alternative embodiment, the relative position of the balls of the calibration solid in space is deliberately modified in each experiment.

In both embodiments, the relative position and distance of the projected centers of the balls on the sensors of the cameras vary in each experiment. For example, for a specific camera and a calibration solid of two balls, in experiment 1 (or first experiment) the relative distance between the projected centers of the balls is the maximum possible distance; in experiment 2 (or second experiment), said relative distance drops to half; and in experiment 3 (or third experiment), the connected regions corresponding to the projected balls appear partially overlapping.

This variability, which favors estimating the calibration parameters, is facilitated when the calibration solid comprises two or more balls.

In all cases, the dimensions and characteristics of the shape of the calibration solid are known. When the experiments use a calibration solid formed by a single ball, it is possible to immediately link the diameter observed in the image and the actual diameter of the ball given that it is known and unique. In case two or more balls are used they have a different diameter but, the exact diameter value is not needed for carrying out the invention. Balls with different diameters allow to identify each ball by comparing if one ball is greater or smaller than the other one and therefore the exact value of the diameter is not needed. Additionally, the value of the diameter is not relevant in the invention since the method requires determining the center of the ball or balls from the shape of the perimeter seen from a camera and said determination does not depend on the value of the diameter.

When there are several balls, a specific ball can be positioned closer than another ball or other balls such that the apparent size of either ball depends not only on its actual dimensions but also on the orientation of the space of the solid since one ball can be closer than another ball by increasing the apparent dimensions thereof in the image. These problems, in addition to those identified above, are solved with one embodiment of the invention.

In this particular embodiment, the step of post-processing the captured data comprises performing, for each camera $Cam_j$, the following additional steps:

determining the set of pairs of points $p_{k_1}', p_{k_2}'$ of the space, with $k_1$ different from $k_2$, which represent centers of balls of the calibration solid of one and the same experiment;

zero-initializing a value of the position error $e_j$ of the optical center $c_j$ of the camera $Cam_j$;

carrying out the following sub-steps for each pair p of points $p_{k_1}', p_{k_2}'$ with $p=1 \ldots N_p$, $N_p$ being the total number of pairs of points:

i. determining $\overline{p_{k_1}' p_{k_2}'}$ as the segment joining points $p_{k_1}'$ and $p_{k_2}'$ ii. determining $cm'_{k_1 k_2}$ as the midpoint of said segment, iii. determining $d_{k_1 k_2}$ as the actual distance between the centers of the balls $BL_{k_1}$ and $BL_{k_2}$ of the calibration solid, iv. determining $r_{k_1}'$ as the epipolar line extending from point $p_{k_1}'$ and the optical center of the camera $c_j$ to be corrected, v. determining $r_{k_2}'$ as the epipolar line extending from point $p_{k_2}'$ and the optical center of the camera $c_j$ to be corrected, vi. determining the points $p_{k_1}$, correction of point $p_{k_1}'$, and $p_{k_2}$, correction of point $p_{k_2}'$, of the inner space of the surface as the points which satisfy:
being on the line defining segment $\overline{p_{k_1}' p_{k_2}'}$;
the distance between $p_{k_1}$ and $p_{k_2}$ being $d_{k_1 k_2}$;
the midpoint $cm_{k_1 k_2}$ between $p_{k_1}$ and $p_{k_2}$ being $cm'_{k_1 k_2}$;

vii. determining the epipolar line $r_{k_1}$ as the line parallel to the epipolar line $r_{k_1}'$ which passes through point $p_{k_2}$;

viii. determining the epipolar line $r_{k2}$ as the line parallel to the epipolar line $r_{k_2}'$ which passes through point $p_{k2}$;

ix. determining the corrected optical center $\tilde{c}_j$ as the intersection between epipolar lines $r_{k_1}$ and $r_{k_2}$;

x. determining the value of the position error for the pair p as $$e_j^p = (c_j - \tilde{c}_j)/N_p$$

xi. determining $e_j$ as $e_j + e_j^p$;

determining a new optical center of the camera $Cam_j$ by means of the correction of the position error $e_j$ as $\hat{c}_j = c_j + e_j$.

As described above, the estimation of the extrinsic parameters is performed using point elements, the centers of the spheres, which allow estimating with precision the orientation of the optical axis of the cameras in space. However, there is one degree of freedom with respect to the distance from the optical centers of the cameras to the point of convergence. The images captured by the cameras can thereby be enlarged or magnified, i.e., they cause the effect of the cameras being closer to the photographed object than what they actually are. This circumstance can generate an incorrectness in the scale of the reconstructed objects which should be corrected based on dimensional references.

One option is to use the observed diameter of the balls in the image. This approach can be valid when the photographed calibration solid comprises a single ball since, as indicated above, there is an immediate correspondence between the actual dimension of the diameter of the ball and the measured diameter of the connected region corresponding to said projected ball. This measurement is based on the number of pixels of the diameter and on the dimensions of each pixel. Nevertheless, due to the fact that the estimation of the diameter of the balls in the image depends on the segmentation algorithm used for obtaining the connected regions which represent the balls, this estimation may sometimes not be precise enough for the suitable calculation of the scale.

Thus, the scale correction obtained by means of this technique may lack sufficient precision since it largely depends on camera resolution and on the computation of the pixels of the diameter. For example, by means of segmentation techniques which distinguish between the connected region and the background of the image, it is possible for the pixels of the edges of the connected region to become eroded (eliminated) or dilated (added), which leads to a decrease or increase in the measured size of the projected ball, and therefore to an incorrect scale correction. The variations due to this effect of the estimated measurements may be sufficient for not performing a precise correction of the scale.

To avoid this problem, in a preferred embodiment of the invention a calibration solid of two or more balls attached by rods is used. The scale correction in this case is performed based on the distance between the projected centers of the balls and not with respect to the dimensions of the balls. The distance between the centers is not affected by the effects of erosion or dilation associated with segmentation. Thus, the rods must be of a known geometry in order to know what the actual distance is between the centers of the balls of the calibration solid.

The calibration method of the invention continues, according to this specific embodiment, with the following steps of scale correction. First, for each experiment, the points of the three-dimensional space $p_{k_1}', p_{k_2}', \ldots$ which most likely correspond with the centers of the balls of the calibration solid are determined. These estimated centers are subsequently grouped in pairs, p. It should be observed that the determination of the points of the space is performed by carrying out the steps of the method described above.

Next, a value of the position error $e_j$ of the optical center $c_j$ of each camera is initialized. Nil errors are assumed in this initial step, and they will be refined as the method of scale correction proceeds according to an iterative process.

For each pair of points p of the previously estimated space, the joining segment $\overline{p_{k_1}' p_{k_2}'}$ joining said points and the midpoint $cm'_{k_1 k_2}$ are determined. Likewise, for the pair of balls corresponding with each pair of points of the estimated space, the actual distance $d_{k_1 k_2}$ between the centers of said balls of the calibration solid is determined.

Next, the epipolar lines, $r_{k_1}'$ and $r_{k_2}'$, which pass through the points of the estimated space $(p_{k_1}', p_{k_2}')$ and through the optical center $c_j$ of the j-th camera to be corrected are determined.

The method continues by determining the corrected points of the space, $p_{k_1}$ and $p_{k_2}$. To that end, it is required that these points satisfy three conditions: being located on the same line defined by the joining segment $\overline{p_{k_1}' p_{k_2}'}$, their distance being equal to the actual distance $d_{k_1 k_2}$ between the centers of the balls of the calibration solid, and the midpoint between them must coincide with the estimated midpoint $cm'_{k_1 k_2}$.

From corrected points of the space, the corrected epipolar lines $r_{k_1}$ and $r_{k_2}$ which pass through said points and are parallel to the epipolar lines $r_{k_1}'$ and $r_{k_2}'$ are determined. As a result of these corrected epipolar lines, the corrected optical center $\tilde{c}_j$ of the j-th camera is estimated such that it is matched with the intersection of the corrected epipolar lines.

The position error of the optical center of the j-th camera for a pair of specific points p is estimated as:

$$e_j^p = (c_j - \tilde{c}_j)/N_p$$

$N_p$ being the total number of pairs of points to be analyzed for the j-th camera. Thus, the position error of the optical center $e_j$ of the j-th camera is calculated from the contribution of all the position errors $e_j^p$ for alls the pairs of points p.

Finally, the extrinsic parameter given by the position of the optical center $\hat{c}_j$ of the j-th camera is calculated as the estimated value of the optical center $c_j$ plus the calculated value of error $e_j$. It should be observed that all the steps performed for a specific j-th camera must be repeated for each of the cameras of the device.

In a particular embodiment, step 2) of calculating the points $p_{ik}'$ according to the invention, or the steps according to the embodiment in which the scaling correction is carried out by making use of at least two balls, or both executed sequentially, are performed iteratively until complying with a stop criterion, preferably a maximum pre-established number of iterations or a pre-selected maximum error value.

In a preferred embodiment, both types of steps are executed sequentially and iteratively such that, in each iteration, after the steps of estimating the extrinsic parameters of the cameras of the device, the step of scale correction or adjustment is carried out. Thus, upon concluding the scale adjustment, if the stop criterion has not been attained, another iteration will be performed with the steps of the method for estimating the extrinsic parameters followed by a new scale adjustment. The preferred stop criterion is established as a threshold on the variation of scale adjustments $e_j$ between the last iteration and the preceding one. When this variation falls below a specific threshold, it is considered that the calibration has attained the required precision and the method ends definitively.

Advantageously, performing the calibration method iteratively assures that a minimum precision is being attained in the estimation of the extrinsic parameters, which is essential for the correct performance of subsequent object reconstructions.

In a particular embodiment, in the sub-step in which the extrinsic calibration parameters of step 2) are determined, a descent algorithm, a conjugate gradient method, or a GMRES (Generalized Minimal RESidual Method) is applied.

A descent algorithm, conjugate gradient method, or GMRES, must be understood to be mathematical algorithms which numerically solve linear equation systems. These algorithms allow calculating the extrinsic parameters in an optimal manner, minimizing total computation times of the calibration method upon attaining convergence in a very small number of iterations.

In a particular embodiment, the determination of the pixel $px_{ijk}$ corresponding to the center of the connected region $BP_k^{ij}$ is based on the segmentation of said connected region $BP_k^{ij}$ in the images $I_{ij}$ acquired by the plurality of cameras, particularly using a thresholding algorithm.

The step of post-processing which allows estimating the center of each connected region is based on segmenting said connected region. Segmentation must be understood to mean, as discussed above, a post-processing technique which allows locating the boundaries of an object within an image; in the context of the invention, segmentation allows distinguishing the connected region or regions from the background of the image and the rod or rods, if there are any.

In a preferred embodiment, the segmentation technique used is thresholding, which must be understood to mean the post-processing technique which converts a color or gray-scale image into a binary image, i.e., an image with only two levels of gray such that the objects are separated from the background. In the context of the invention, the connected regions acquire a value of gray and the background and the rods (if there are any) acquire another different value of gray. Preferably, the two values of gray selected are white and black to maximize object-background contrast.

It should be observed that the segmentation process for obtaining the connected regions can lead to small errors in reference to dimension (apparent erosions or dilations depending on the level of exposure of the capture, contrast with the background, color, texture, etc.). This is not a problem in detecting the center thereof, since the method is robust against the possible dilations or erosions the perimeter of the circles may suffer.

However, as discussed above, these effects on the image can lead to errors in the estimation of the actual dimensions of the balls corresponding to the connected regions, so the scale correction should not be based on these dimension estimations.

In a particular embodiment, the balls of the calibration solid are spherical and the determination of the pixel $px_{ijk}$ corresponding to the center of the connected region $BP_k^{ij}$ is performed by fitting a circumference to the contour of said connected region $BP_k^{ij}$ in the images $I_{ij}$ or calculating the center of masses of the connected region $BP_k^{ij}$.

Using spheres in the calibration solid entails a dual advantage. On one hand, it is possible to fit circumferences to the contour of the connected regions corresponding to said spheres for calculating their centers. The small errors induced by the segmentation process thereby have no relevance in the calculation of the center. On the other hand, it is possible for there to be experiments in which one of the cameras captures the spheres of the calibration solid partially overlapping, i.e., the connected regions corresponding to said projected spheres are shown overlapping in the images. Nevertheless, it is possible to determine the centers of the connected regions by fitting circumferences to the partially visible arcuate contours of each of the regions.

It should be observed that it is possible for there to be experiments in which one of the cameras cannot capture any of the spheres of the calibration solid because they are completely overlapping. In these cases, it is not possible to determine some of the centers of the connected regions. However, as discussed above, the calibration solids with more than one ball favor the variability of views, so it is highly likely that the camera which did not capture one of the balls in one experiment may have captured it in the remaining experiments.

In a particular embodiment, the number of experiments N must comply with the condition N≥6/NB.

The calibration of the device requires compliance with certain geometric restrictions. The extrinsic parameters of the cameras have 6 degrees of freedom: position of the optical center (3 degrees of freedom corresponding to the three coordinates of space) and orientation of the optical axis in three-dimensional space (3 degrees of freedom corresponding to the three coordinates of the orientation vector). Therefore, a minimum of 6 balls must be captured for the systems to have 6 equations and to be at least specific or even over-specific. Furthermore, it must be checked that the centers of the balls of the set of captures are not on the same plane, to prevent the occurrence of indeterminations causing any of the equations to be a linear combination of others, and therefore making an insufficient effective number of equations available.

In a particular embodiment, the at least one distinctive characteristic of the at least one ball of the calibration solid which allows establishing the correspondence between each connected region $BP_k^{ij}$ in the acquired images $I_{ij}$ and the at least one ball of the calibration solid captured in the image is:
 the color of the ball;
 the size of the ball;
 the texture of the ball;
 the shape of the ball;
 a combination of any of the foregoing.

Upon using a calibration solid comprising more than one ball, each of them should be able to be identified by itself in the images to favor post-processing, and thereby reduce total computation times of the calibration. Among others, the attributes of the balls which may be different from one another are their colors, sizes, textures, and/or shapes. Such characteristics can be distinguished in the captured images.

The color can be recognized directly by the cameras if they offer the color information of each pixel. If the cameras capture black and white images, the distinction is more difficult. As regards the actual sizes of the balls, if there is no other distinctive characteristic, the sizes must be sufficiently different so that the apparent size ranges in the sensors (size of the projected circle) varying depending on the position of each sphere in the observation region according to the closeness thereof to the cameras do not overlap.

In a particular embodiment, the at least one calibration solid comprises two or more substantially spherical balls of different diameters attached by rods of a pre-established geometry.

Having a calibration solid of spheres with different diameters entails a dual advantage: on one hand, it facilitates the distinction of the balls in the images, and on the other hand, it favors the variability of views in the captures.

In a particular embodiment, the observation region has a polyhedral or spheroidal configuration, the center of the polyhedral or spheroidal region corresponding with the pre-established point of the observation region with respect to which the orientation vectors $\vec{O_j}$ of the optical axes of the plurality of cameras are oriented.

The optimal distribution of the cameras is that which defines a spherical region. In this configuration, the objects are completely surrounded by the cameras and can be photographed from a number of angles and positions covering 360 degrees. The optimal point of convergence of the cameras for this configuration is the center of said sphere. Nevertheless, according to other embodiments the point of convergence is moved vertically, for example.

In another embodiment, the observation region is polyhedral and its centroid is the pre-established point with respect to which the orientation vectors $\vec{O_J}$ of the optical axes of the plurality of cameras are oriented.

In a particular embodiment, the at least one positioning mechanism of the calibration solid is configured for positioning the calibration solid at the pre-established point of the observation region with respect to which the orientation vectors $\vec{O_J}$ of the optical axes of the plurality of cameras are oriented.

Advantageously, by orienting all the cameras towards a specific point of the observation region, it is assured that all of them will simultaneously capture the object or calibration solid when it is positioned at said point of the observation region or at least in the volume resulting from the intersection of the volumes defined by the depth of field of each of the cameras where these volumes contain the point with respect to which the cameras in the observation region are oriented.

In a particular embodiment, the at least one positioning mechanism of the calibration solid is configured for letting the calibration solid fall due to the action of gravity. In another particular embodiment, the at least one positioning mechanism of the calibration solid is configured for casting the calibration solid from a lower part of the observation region.

In both embodiments, upon letting the calibration solid fall or upon casting it from the lower part of the observation region, it remains in the air temporarily without any points or regions being concealed due to holding or support surfaces or tools. Thus, given that the calibration solid is photographed suspended in the air, there is no support impeding visual access of the cameras to said solid or to part of same, particularly when it is positioned in the observation region.

In different experiments, the calibration solid is photographed in different positions. If it is cast or left to fall, natural variability can assure this effect. To enhance said variability, a calibration solid of balls with different diameters should be used.

If this variability is not sufficient or the calibration solid is positioned by other means, sufficient variation in the relative positions of the balls of the calibration solid must deliberately be provided in the capture of images according to different experiments to favor the estimation of the extrinsic parameters.

In a particular embodiment, the method further comprises, for each camera $Cm_j$:
  its reorientation; or
  its repositioning; or
  both actions;
  depending on the specific extrinsic calibration parameters, such that the new orientation vectors $\vec{O}_j$ of the optical axes of each camera $Cm_j$ are oriented towards the pre-established point of the observation region.

The characterization of the extrinsic parameters allows determining the error thereof and this error allows, for example, applying corrections based on the captured images. Nevertheless, according to one embodiment once the extrinsic parameters have been estimated, it is possible to reorient and/or reposition the cameras such that they are oriented towards one and the same point of interest in the observation region and/or are located in the positions which best define the observation region, reducing the error of the extrinsic parameters.

A second inventive aspect provides a calibration system for calibrating an object reconstruction device, comprising means according to the first inventive aspect and wherein the computational equipment is adapted for carrying out steps of the first inventive aspect.

A third inventive aspect provides a computer program comprising instructions which, when the program is run by computational equipment, causes the computational equipment to carry out the steps of the method according to the first inventive aspect.

A fourth inventive aspect provides a computer-readable medium comprising instructions which, when run by computational equipment, causes the computational equipment to carry out the steps of the method according to the first inventive aspect.

DESCRIPTION OF THE DRAWINGS

These and other characteristics and advantages of the invention will become more apparent from the following detailed description of a preferred embodiment given solely by way of illustrative and non-limiting example in reference to the appended drawings.

DETAILED DESCRIPTION OF THE INVENTION

Figure 1:
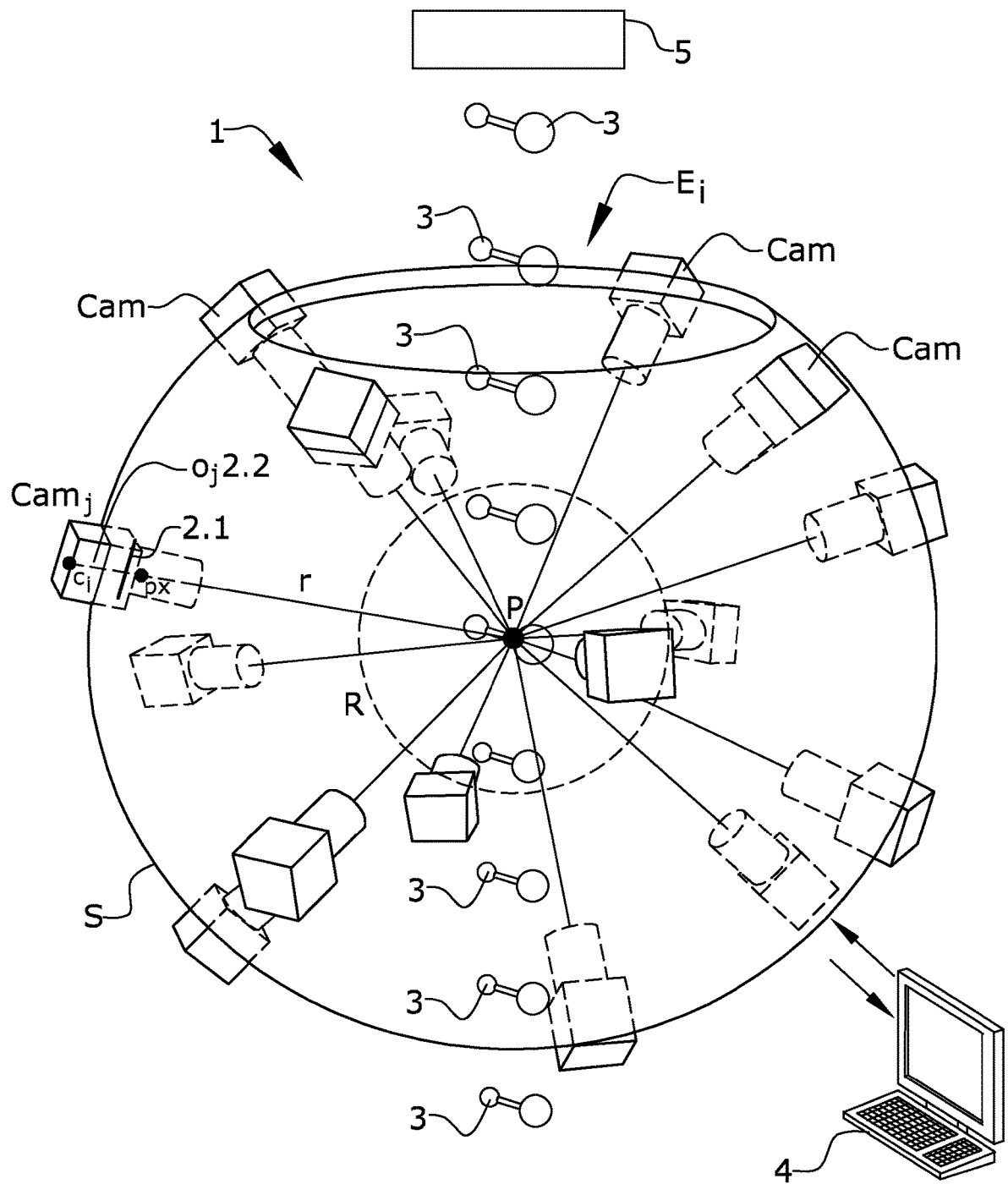
FIG. 1 shows an illustrative example of the step of taking data of the method of the invention by using of an image capture device and subsequent reconstruction of the captured object.

FIG. 1 shows an illustrative example of the step of taking data of the method according to an embodiment of the invention. The data required for carrying out the calibration of the device (1) of this embodiment is acquired by a plurality of C cameras, one of which has been identified in the figure as the j-th camera, $Cam_j$, where J=1 . . . C. This data capture is performed by means of a predetermined number N of experiments (E), the i-th experiment of which has been identified in the drawing as $E_i$, for all i=1 . . . N.

The cameras (Cam) are spatially distributed in positions of a closed surface (S) enclosing an observation region (R) therein. In this example, the surface (S) is spherical and the observation region (R) is an inner space, where the orientation vectors $\vec{O}_j$ of the optical axes of the cameras (Cam) are oriented towards the central point (P) of the surface (S).

For carrying out the calibration, the device (1) comprises a calibration solid (3) to be photographed by the plurality of cameras (Cam). When the calibration solid (3) to be reconstructed is positioned in said observation region (R), the cameras (Cam) remain positioned around it, which enables photographing said calibration solid (3) from multiple angles and positions. The calibration solid (3) of FIG. 1 comprises two spheres of different diameter attached by a rod of known geometry. FIG. 1 shows a number of calibration solids (3) for schematically showing the process of falling from an upper position to a lower position. The images of the calibration solid (3) are captured when said calibration solid (3) passes through the observation region (R).

The device (1) also comprises a positioning mechanism (5) of the calibration solid (3) configured for positioning said calibration solid (3) in the observation region (R). In this embodiment, the positioning mechanism (5) is a device which lets the solid to be captured fall such that a path which passes through the observation region (R) is assured. Finally, the device to be calibrated comprises a computational equipment (4) configured for simultaneously communicating with the positioning mechanism (5) and with the plurality of cameras (Cam).

The following sub-steps must be performed to acquire the data required for carrying out the calibration of the device (1):

Providing the intrinsic parameters of the cameras (Cam). These parameters can be found on the technical data sheets thereof or can be provided by their manufacturers or distributors.

Initializing the extrinsic parameters of the cameras (Cam) by establishing an approximate initial value of their optical centers $c_j$ and their orientations in space $\vec{O}_j$.

Establishing a bijective correspondence $f_j$ between each coordinate of a pixel px of the image captured by the sensor (2.1) of the camera $Cam_j$ and the set of coordinates of the points of the epipolar line r of the space, which passes through the optical center $c_j$ of the camera $Cam_j$ and are projected by the optic (2.2) of the camera $Cam_j$ in that same pixel px after the image capture;

performing N experiments as follows:

The computational equipment (4) communicates with the positioning mechanism (5) in order to position the calibration solid (3) in the observation region (R). In this particular example, the positioning mechanism (5) lets the calibration solid fall due to the action of gravity from the highest possible position of the surface (S).

Simultaneously, the computational equipment (4) activates the plurality of cameras (Cam) so that each of them ($Cam_j$) captures an image of the calibration solid (3) positioned in the observation region (R). In particular, the suitable moment for image acquisition is when the calibration solid (3) is positioned in the center (P) of the spherical observation region (R).

Finally, the images acquired by the cameras (Cam) are sent to the computational equipment (4) for post-processing.

In the embodiment shown in FIG. 1, by letting the calibration solid (3) fall due to the action of gravity, it remains in the air temporarily without being concealed by the positioning mechanism (5). Thus, given that the calibration solid is photographed suspended in the air, there is no visual impediment of the cameras with respect to said solid or a part of same, particularly when it is positioned in the center of the observation region (R), which is also the point of convergence (P) of the cameras (Cam) save the errors leading to the need for calibration.

Furthermore, in the different experiments the natural variability established by letting the calibration solid (3) fall under different initial conditions can assure that the calibration solid (3) is photographed in different positions and orientations. To enhance said variability, a calibration solid (3) of balls with different diameters is furthermore used in the example of FIG. 1.

Given that there are two balls of the calibration solid (3), to assure geometric restrictions and having a system of 6 equations to be solved, the experiments must be at least three in number. Thus, the condition N≥6/NB, where N is the number of experiments and NB is the number of balls of the calibration solid (3), is complied with.

Figure 2A:
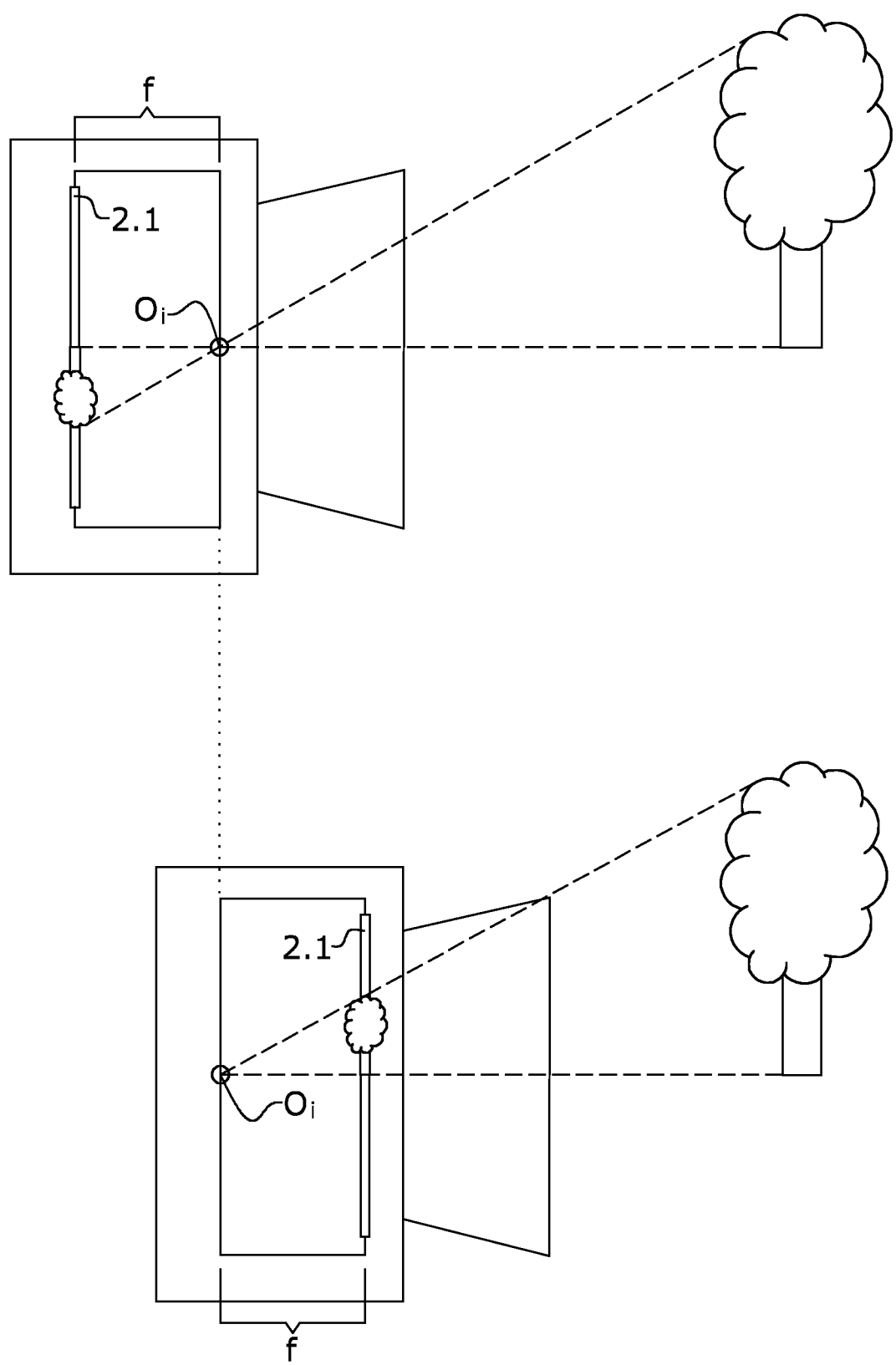
FIG. 2A shows two ways of representation of the projection within a camera having the optical center located between the sensor and the optical lens/lenses or the sensor located between the optical center and the optical lens/lenses.

FIG. 2A schematically illustrate two different ways of representing the projection within a camera $i^{th}$, a first case in the upper part of FIG. 2A shows its optical center $O_i$ located between the sensor (2.1) and the optics (2.2) (represented as a trapezium). In this case the image is inverted; and, a second case in the lower part of FIG. 2A shows its sensor (2.1) located between the optical center $O_i$ and the optics (2.2) resulting in an image having the same orientation than the object being captured by the camera. In both cases the line connecting a point of the real object and the optical center $O_i$ impinges on the sensor (2.1). Both cases may be used as specific examples of cameras for carrying out the invention although the first case is the one commonly used. In both cases the focus (f) is the distance between the optical center $O_i$ and the sensor (2.1).

Figure 2B:
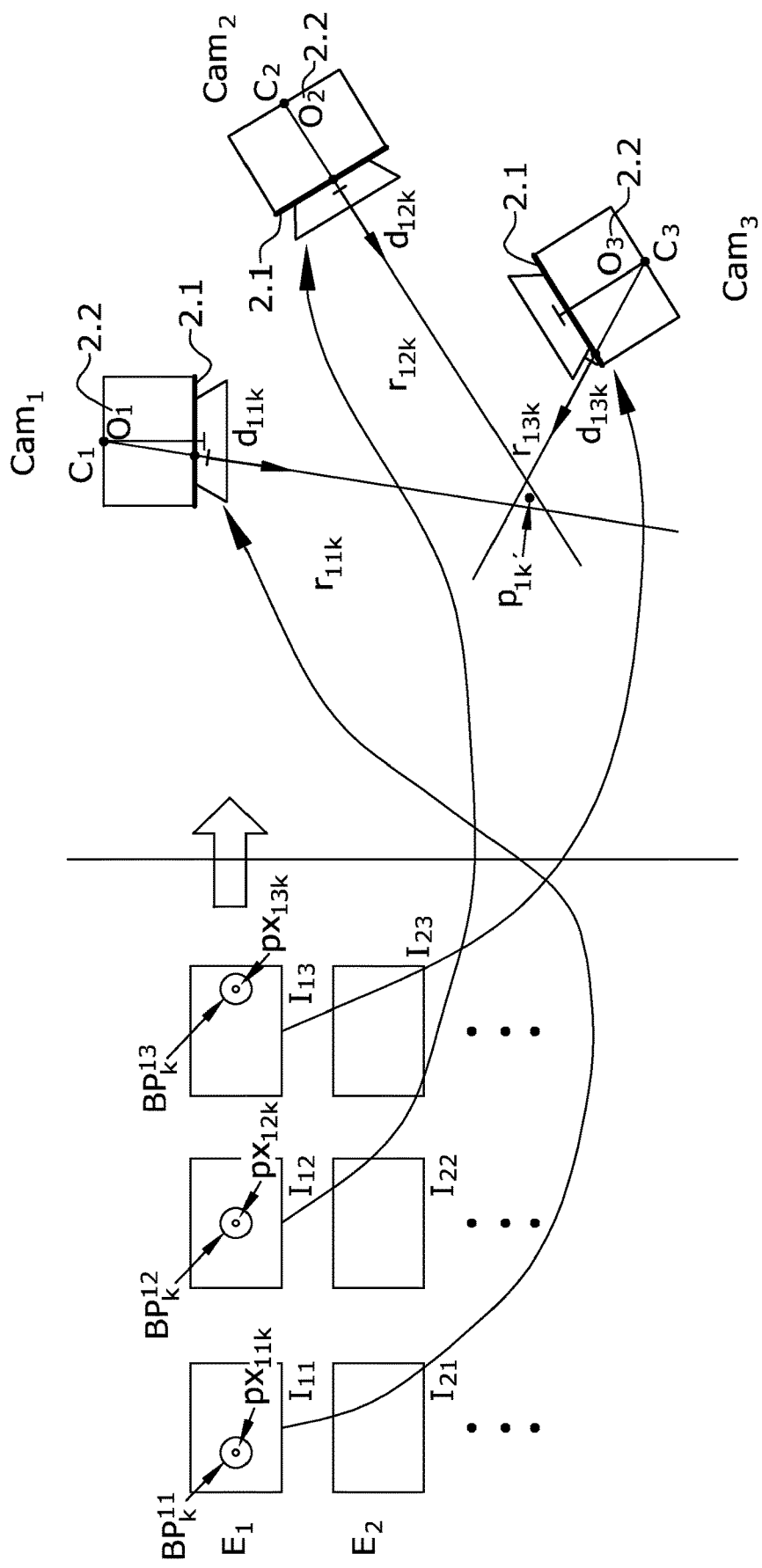
FIG. 2B schematically illustrates the step of post-processing data of the method of the invention.
Figure 3:
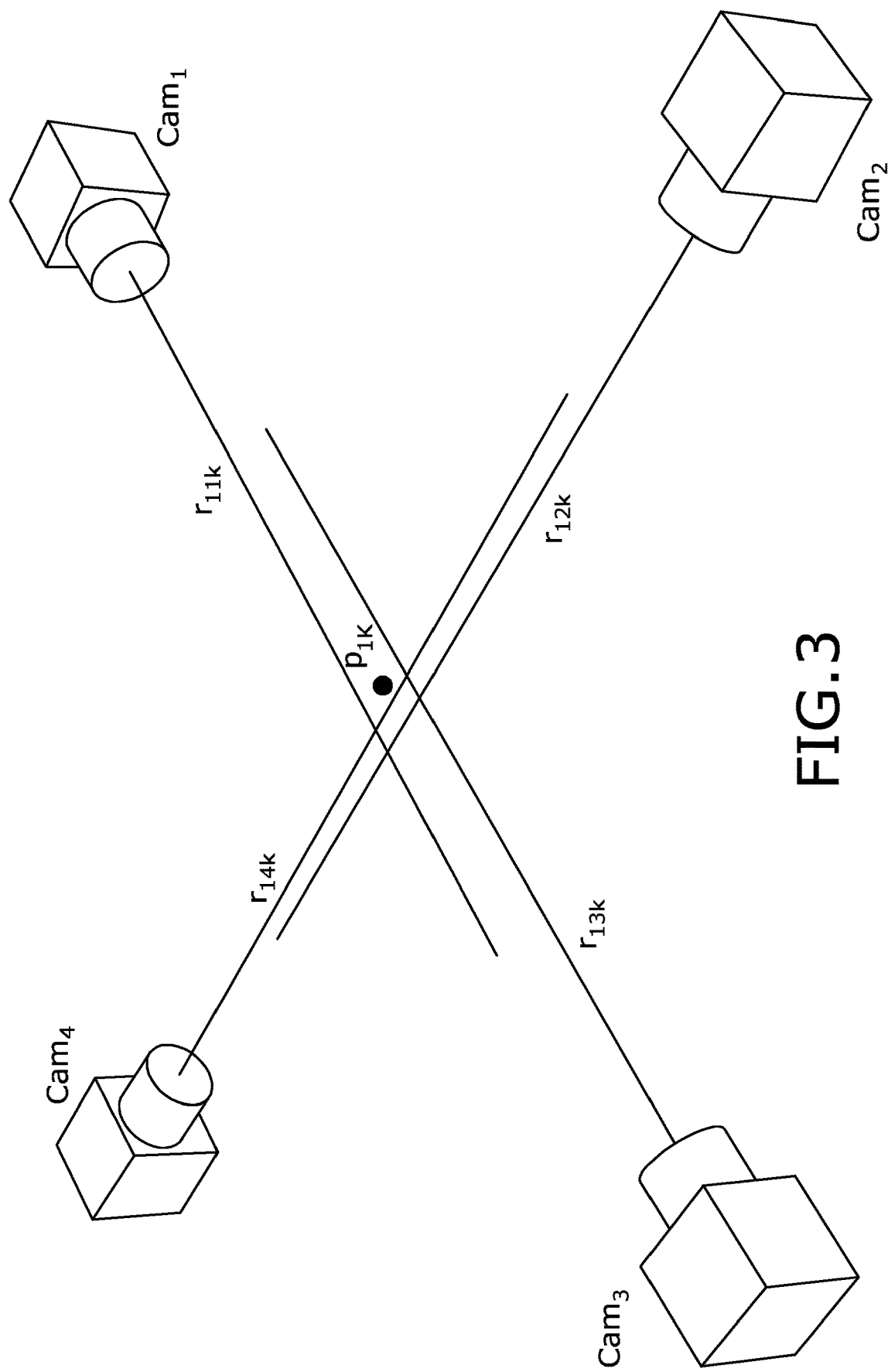
FIG. 3 schematically shows an embodiment with the epipolar lines of four of the cameras of the device which are not correctly calibrated corresponding to a point of the three-dimensional space.

FIGS. 2B and 3 schematically illustrate the step of post-processing data of the method of the invention. On the left side of FIG. 2B, the set of previously acquired data according to the example described in FIG. 1 can be distinguished. This data is the set of images $I_{ij}$ acquired in each i-th experiment, $E_i$, by each J-th camera, $Cam_j$.

FIG. 2B shows in rows the images corresponding to each experiment (identified by index i). The columns identify the camera (index j) which captured the image in a specific experiment.

In the first row corresponding to the first experiment, the circumference and center thereof corresponding to the capture of the ball is shown schematically in each image.

First, post-processing requires going through the set of images, where for each captured image $I_{ij}$ the following sub-steps are carried out:

identifying the connected regions $BP_k^{ij}$ of pixels corresponding to a specific ball $BL_k$ of the calibration solid (3), if it appears in the image $I_{ij}$.

The technique used in the example of FIG. 2B is thresholding, whereby the background of the image and the rod acquire the value one and the connected regions the value one. For the sake of simplicity, the example only shows the connected regions ($BP_k^{11}$, $BP_k^{12}$, $BP_k^{13}$) identified for the three cameras of experiment 1, $E_1$, corresponding with the k-th ball, $BL_k$, of the calibration solid (3).

for each connected region $BP_k^{ij}$ of a ball $BL_k$ of the calibration solid (3) determining:

the pixel $px_{ijk}$ corresponding to the center of said connected region $BP_k^{ij}$. For the sake of simplicity, this example shows the pixels $px_{11k}$, $px_{12k}$, $px_{13k}$ which correspond to the centers of the connected regions $BP_k^{11}$, $BP_k^{12}$, $BP_k^{13}$. The technique used in this example for the determination of the pixels $px_{ijk}$ is the fitting of the contours of the connected regions to a circumference the center of which is estimated. In each of the images of the first experiment the circumference used in the fitting as well as the estimated center is graphically depicted.

the normalized direction vector $d_{ijk}$ of the epipolar line $r_{ijk}$ which corresponds to the pixel $px_{ijk}$ through correspondence $f_j$. For the sake of simplicity, only vectors $d_{11k}$, $d_{12k}$ y $d_{13k}$ are shown in the example.

FIG. 3 shows an example of epipolar lines $r_{ijk}$ of four different cameras to be calibrated. In an ideal scenario, the epipolar lines should converge at a single point of the three-dimensional space. Following the example of FIG. 2B, said point would correspond with the physical center of the ball $BL_k$. However, in an actual scenario like the one shown in FIGS. 2 and 3, the extrinsic parameters of the cameras are not ideal but rather suffer variations, usually changes over time due to various factors. For example, due to precision tolerances of the assembly of the device, the aging of its components, or the mechanical stress it withstands.

Therefore, to continue with the calibration method it must be assumed that 1) the epipolar lines do not have to converge at one a point of the three-dimensional space, and 2) it is possible to determine a point of said three-dimensional space ($p_{1k}'$ in FIGS. 2 and 3) which minimizes the distance to all the epipolar lines $r_{ijk}$. FIG. 3 illustrates both assumptions. It should be observed that the index i has acquired the value 1 since in FIG. 3 only experiment 1, $E_1$, is shown.

Taking said assumptions into account, the method continues in FIG. 2B (right side of the figure) by determining precisely the points of space $p_{ik}'$ which minimize the summation of distances to the epipolar lines $r_{ijk}$ defined by the directions $d_{ijk}$ oriented in an exact manner towards each ball $BL_k$ in each experiment $E_i$. For the sake of simplicity, only point $p_{1k}'$ is shown in FIGS. 2B and 3.

On the right side of FIG. 2B, separated by a vertical line, the three cameras that have captured each of the experiments depicted by rows on the left side of said FIG. 2B are shown. It particularly shows the epipolar lines ($r_{11k}$, $r_{12k}$ and $r_{13k}$) determined respectively specific as lines which pass through the optical center of the camera ($c_1$, $c_2$, $c_3$) and through the point of space which corresponds to the position of the pixel of the sensor (2.1) where the estimation of the center of the projected ball ($px_{11k}$, $px_{12k}$, $px_{13k}$) has been determined. The pixels located on the sensor (2.1) on the right side of the figure are shown as a bullet point symbol, although in this figure the sensor is shown in section. This line is what allows, for example, determining the unit vectors of direction of the epipolar line ($d_{11k}$, $d_{12k}$, $d_{13k}$).

It can be observed that the epipolar lines ($r_{11k}$, $r_{12k}$ and $r_{13k}$) which pass through the optical center of the camera ($c_1$, $c_2$, $c_3$) do not pass through point ($p_{1k}'$) corresponding to the center of the ball of the solid (3) due to position errors, orientation, assembly failures, etc.

Finally, the extrinsic calibration parameters are determined for each camera $Cam_j$ such that the correspondence $f_j$ between the epipolar line defined between the center $c_j$ and the point $p_{ik}'$, and the pixel $px_{ijk}$, for any experiment $E_i$ and for any ball $BL_k$ determined as was just described, is satisfied. For determining these parameters, a conjugate gradient method is used in this particular example.

From these extrinsic parameters, it can be assured that the orientation of the optical axis of the cameras in space has been estimated with precision, but not the position of the optical center thereof. The images captured by the cameras are enlarged or magnified, i.e., they cause the effect that the cameras are closer to the photographed object than what they actually are. This effect is a scale error that must be corrected to know exactly the spatial position of the optical center of each of the cameras.

Figure 4:
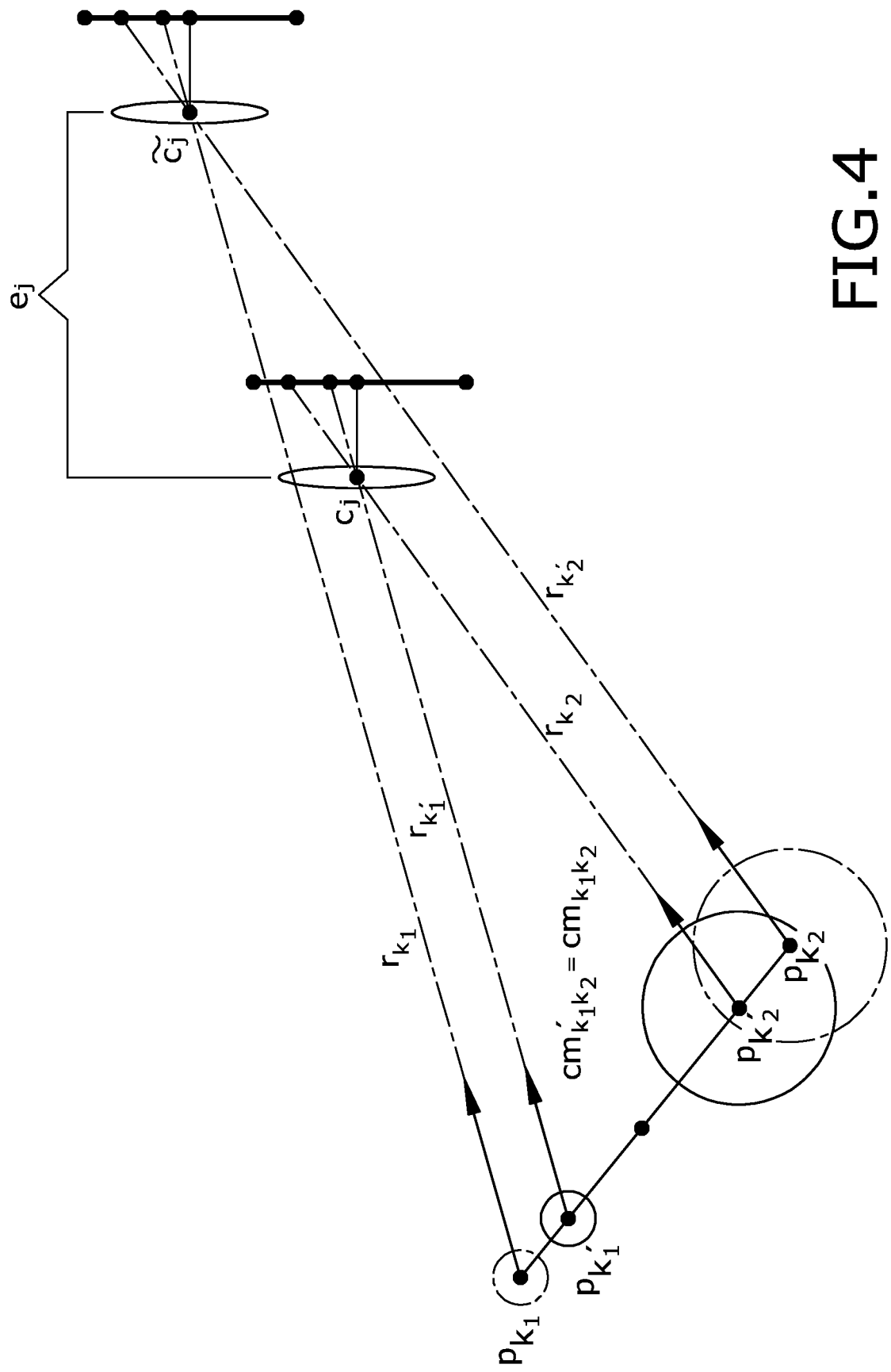
FIG. 4 shows a diagram of the steps of the method according to an embodiment in which a scale correction is carried out.

FIG. 4 illustrates a diagram of this step of the method for correcting the scale. For the sake of simplicity, a diagram of how to correct the optical center of the j-th camera for a pair of analyzed points of the space and for a single experiment is shown. These calculations will be repeated for each pair of points, for each camera, and for each experiment.

First, the points of the three-dimensional space $p_{k_1}',p_{k_2}'$ are determined by means of the method described in the preceding figures. This pair of points p corresponds with the centers of two balls $BL_1$ and $BL_2$ of the calibration solid (3). The center of the segment joining both points $cm'_{k_1 k_2}$ is shown in FIG. 4.

Next, the epipolar lines, $r_{k_1}'$ and $r_{k_2}'$, which pass through the points of the estimated space ($p_{k_1}', p_{k_2}'$) and through the estimated value of the optical center $c_j$ of the j-th camera to be corrected are determined. As mentioned above, this estimated value of the optical center $c_j$ is located closer to the calibration solid (3) than what it actually is. In this figure, the camera is schematically depicted two times, each of those times by means of an ellipse representing the optical unit and by means of a thick vertical line representing the sensor on which the epipolar line is projected. Black circles are also used for identifying intersecting points.

The method continues by determining the corrected points of the space, $p_{k_1}$ and $p_{k_2}$. These points satisfy three conditions: they are located on the same line defined by the segment joining estimated points $p_{k_1}'$ y $p_{k_2}'$, the distance thereof must be equal to the actual distance between the centers of the balls of the calibration solid (3), and the midpoint $cm_{k_1 k_2}$ between them coincide with the estimated midpoint $cm'_{k_1 k_2}$.

Based on corrected points of the space $p_{k_1}$ and $p_{k_2}$, the corrected epipolar lines $r_{k_1}$ and $r_{k_2}$ which pass through said points and are parallel to epipolar lines $r_{k_1}'$ and $r_{k_2}'$ are determined. The intersection of these corrected epipolar lines allows estimating the corrected optical center $e_j$ of the j-th camera.

The position error of the optical center $e_j$ of the j-th camera is calculated as the mean of the differences between the initially estimated optical center $c_j$ and the corrected optical centers $\check{c}_j$ for each pair of points.

Finally, the optical center of the J-th camera is estimated as the estimated value of the optical center $c_j$ plus the value of the position error of the calculated optical center $e_j$.

In a preferred embodiment, the steps of the method embodied in FIGS. 1 to 4 are performed sequentially and iteratively. The step of post-processing data of FIGS. 2 and 3 follow the step of acquiring data, mainly the captured images, of FIG. 1. Next, the step of scale correction of FIG. 4 is performed, and upon concluding this scale correction, another iteration is performed with the steps of acquiring and post-processing data. The method concludes when a stop criterion after scale correction is satisfied. Preferably, the stop criterion is established as a threshold on the variation of the scale adjustments $e_j$ between the last iteration and the preceding one. When this variation falls below a specific threshold, it is considered that the calibration has attained the required precision and the method ends definitively.

After the termination of the method, according to another embodiment it is possible to reorient and/or reposition the cameras (Cam) of the device (1) depending on the estimated extrinsic parameters.

Figure 5:
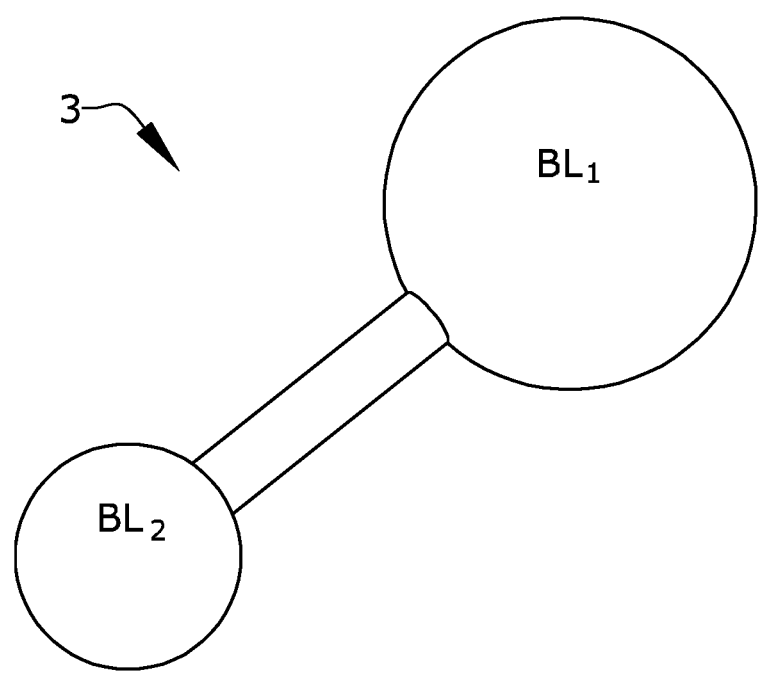
FIG. 5 shows the calibration solid used as an embodiment in the detailed method based on FIGS. 1-4.

FIG. 5 shows in detail the calibration solid (3) used in the preceding examples. This calibration solid (3) comprises two balls, $BL_1$ and $BL_2$, of different diameter and attached by a rod of known geometry. By arranging two balls, two calibration points per experiment and greater variability of views in the captures are obtained, and a scale correction can be carried out based on the distance between the balls. Even more advantageously, the fact that the diameters of the balls are different implies enhancing the natural variability in positioning (when left to fall due to the action of gravity or when cast from the lower position of the observation region (R)) and allows greater distinction of the connected regions corresponding to said projected balls. The size of the balls of the calibration solid (3) of FIG. 5 is such that it complies with being sufficiently different so that the apparent size ranges in the sensors (size of the projected circle) varying depending on the position of each ball in the observation region (R) do not overlap.

The invention claimed is:

1. A computer-implemented method for calibrating an object reconstruction device, wherein the object reconstruction device comprises:

a) a plurality of cameras (Cam) adapted for image acquisition, a j-th camera of the plurality of cameras (Cam) being identified as $Cam_j$ for all j=1 ... C, comprising:
  a sensor with a sensitive area formed by pixels for capturing an image, and
  an optic, with an optical axis with orientation vector ($\vec{O_j}$) for establishing a focus on the sensor and a portion of a space projected on the sensor, and
  the plurality of cameras (Cam) being spatially distributed in positions of a closed surface (S) defining an observation region (R) therein, where the cameras (Cam) are configured for having the orientation vector ($\vec{O_j}$) of their optical axes oriented towards a pre-established point (P) of the observation region (R);

characterized in that the object reconstruction device (1) further comprises:

b) a calibration solid comprising a number (NB) of balls (BL), with NB greater than or equal to one, the k-th ball being identified as $BL_k$ for all k=1 ... NB and wherein if two or more balls are used they have different diameters;

c) at least one positioning mechanism of the calibration solid configured for positioning said calibration solid in the observation region (R);

d) computational equipment in communication with the at least one positioning mechanism and with the plurality of cameras (Cam) and configured for:
  causing in the plurality of cameras (Cam) the capture of images of the observation region (R) when the at least one positioning mechanism positions the calibration solid in said observation region (R), and
  receiving the images acquired by the plurality of cameras (Cam);

wherein the method comprises the following steps:

(1) a step of data capture of the object reconstruction device comprising the following sub-steps:
for each of the cameras ($Cam_j$), providing their intrinsic parameters and estimated values of at least the following extrinsic calibration parameters:
  orientation ($\vec{O_j}$) in the observation region (R) within the closed surface (S) and
  position of an optical center ($c_j$) being also the point on the optical axis of the optics where all rays passing through it remain unrefracted;
establishing, based on the intrinsic and extrinsic parameters, a bijective correspondence ($f_j$) between each coordinate of a pixel (px) of the image captured by the sensor of the camera ($Cam_j$) and the set of coordinates of the points of the epipolar line (r) of the space, which passes through the optical center ($c_j$) of the camera ($Cam_j$) and are projected by the optic of the camera ($Cam_j$) in that same pixel px after the image capture;
performing a predetermined number N of experiments (E), the i-th experiment being identified as $E_i$ for all i=1 ... N, according to the following sub-steps:
  the positioning mechanism positioning the calibration solid in the observation region (R) at a different position;
  activating the plurality of cameras (Cam) for each of them ($Cam_j$) to capture an image of the calibration solid positioned in the observation region (R);
  receiving the images ($I_{ij}$) acquired by the cameras (Cam),
where in each image ($I_{ij}$) each of the balls ($BL_k$) captured in the image is shown as connected regions $BP_k^{ij}$ of pixels, where index i with i=1 ... N denotes the experiment number, index j denotes the camera which has captured the image ($I_{ij}$) with j=1 ... C, and k denotes the ball (BL) from among the balls of the calibration solid with k=1 ... NB, (2) a step of post-processing the captured data comprising the following sub-steps:
going through the set of captured images ($I_{ij}$), where for each captured image ($I_{ij}$) the following sub-steps are carried out:
  identifying the connected regions ($BP_k^{ij}$) of pixels corresponding to a specific ball ($BL_k$) of the calibration solid, if it appears in the image ($I_{ij}$);
  for each connected region ($BP_k^{ij}$) of a ball ($BL_k$) of the calibration solid that does appear in an image ($I_{ij}$), determining:
    a pixel ($px_{ijk}$) corresponding to the center of said connected region ($BP_k^{ij}$) in the image ($I_{ij}$); and
    in the space within the closed surface, determining a normalized direction vector ($d_{ijk}$) of an epipolar line ($r_{ijk}$) which corresponds to the pixel ($px_{ijk}$) through correspondence ($f_j$);
determining the points of the space ($p_{ik}'$) which minimize the summation of distances to the epipolar lines ($r_{ijk}$) defined by a directions ($d_{ijk}$) of each ball ($BL_k$) in each experiment ($E_i$):

$$p'_{ik} = \left[\sum_{j=1}^{C}[I - d_{ijk}d_{ijk}^T]\right]^{-1} \sum_{j=1}^{C}[I - d_{ijk}d_{ijk}^T]c_j$$

where I is the identity matrix and where T denotes the transposition of the vector $d_{ijk}$;
for each camera ($Cam_j$), determining the extrinsic calibration parameters such that the correspondence ($f_j$) between the epipolar line defined between the center ($c_j$) and the point ($p_{ik}'$), and the pixel ($px_{ijk}$), for any experiment ($E_i$) and for any ball ($BL_k$) is satisfied.

2. The method according to claim 1, wherein the number (NB) of balls (BL) of the calibration solid is greater than or equal to two and wherein the balls (BL) are attached by rods.

3. The method according to claim 2, wherein the step of post-processing the captured data comprises performing, for each camera ($Cam_j$), the following additional steps:
determining a set of pairs of points ($p_{k_1}', p_{k_2}'$) of the space, with $k_1$ different from $k_2$, which represent centers of balls ($BL_{k1}$ y $BL_{k2}$) of the calibration solid (3) of one and the same experiment (E);
zero-initializing a value of the position error ($e_j$) of the optical center ($c_j$) of the camera ($Cam_j$);
carrying out the following sub-steps for each pair (p) of points ($p_{k1}', p_{k2}'$) with p=1 ... $N_p$, $N_p$ being the total number of pairs of points:
  i. determining $\overline{p_{k_1}'p_{k_2}'}$ as the segment joining points $p_{k_1}'$ and $p_{k_2}'$, ii. determining $cm'_{k_1 k_2}$ as the midpoint of said segment,
iii. determining $d_{k_1 k_2}$ as the actual distance between the centers of the balls $BL_{k_1}$ and $BL_{k_2}$ of the calibration solid (3),
iv. determining $r_{k_1}'$ as the epipolar line extending from point $p_{k_1}'$ and the optical center of the camera $c_j$ to be corrected,
v. determining $r_{k_2}'$ as the epipolar line extending from point $p_{k_2}'$ and the optical center of the camera $c_j$ to be corrected,
vi. determining the points $p_{k_1}$, correction of point $p_{k_1}'$, and $p_{k_2}$, correction of point $p_{k_2}'$, of the space within the closed surface (S) as the points which satisfy: being on the line defining the segment $\overline{p_{k_1}' p_{k_2}'}$; the distance between $p_{k_1}$ and $p_{k_2}$ being $d_{k_1 k_2}$; the midpoint $cm_{k_1 k_2}$ between $p_{k_1}$ and $p_{k_2}$ being $cm'_{k_1 k_2}$;
vii. determining the epipolar line $r_{k_1}$ as the line parallel to the epipolar line $r_{k_1}'$ which passes through point $p_{k_1}$;
viii. determining the epipolar line $r_{k_2}$ as the line parallel to the epipolar line $r_{k_2}'$ which passes through point $p_{k_2}$;
ix. determining the corrected optical center $\tilde{c}_j$ as the intersection between epipolar lines $r_{k_1}$ and $r_{k_2}$;
x. determining the value of the position error for the pair p as $e_j^p = (c_j - \tilde{c}_j)/N_p$ xi. determining $e_j$ as $e_j + e_j^p$;
determining a new optical center of the camera $Cam_j$ by means of the correction of the position error $e_j$ as $\hat{c}_j = c_j + e_j$.

4. The method according to claim 2, wherein at least one of:
step 2) of calculating points $p_{ik}'$ of claim 1,
the steps according to claim 2, or
step 2) of calculating points $p_{ik}'$ of claim 1 and the steps according to claim 2 executed sequentially,
are performed iteratively until complying with a stop criterion, preferably a maximum pre-established number of iterations or a pre-selected maximum error value.

5. The method according to claim 1, wherein in the sub-step in which the extrinsic calibration parameters of step 2) are determined, a descent algorithm, a conjugate gradient method, or a GMRES (Generalized Minimal RESidual Method), is applied.

6. The method according to claim 1, wherein the determination of the pixel ($px_{ijk}$) corresponding to the center of the connected region ($BP_k^{ij}$) is based on the segmentation of said connected region ($BP_k^{ij}$) in the images ($I_{ij}$) acquired by the plurality of cameras (Cam), particularly using a thresholding algorithm.

7. The method according to claim 6, wherein the balls (BL) of the calibration solid (3) are spherical and the determination of the pixel ($px_{ijk}$) corresponding to the center of the connected region ($BP_k^{ij}$) is performed by fitting a circumference to the contour of said connected region ($BP_k^{ij}$) in the images ($I_{ij}$) or calculating the center of masses of the connected region ($BP_k^{ij}$).

8. The method according to claim 1, wherein the predetermined number of experiments (N) must comply with the condition $N \geq 6/NB$.

9. The method according to claim 1, wherein the at least one distinctive characteristic of the at least one ball (BL) of the calibration solid (3) which allows establishing the correspondence between each connected region ($BP_k^{ij}$) in the acquired images ($I_{ij}$) and the at least one ball (BL) of the calibration solid (3) captured in the image is one or more of:
the color of the ball (BL);
the size of the ball (BL);
the texture of the ball (BL); and
the shape of the ball (BL).

10. The method according to claim 2, wherein the at least one calibration solid (3) comprises two or more substantially spherical balls (BL) of different diameters attached by rods of a pre-established geometry.

11. The method according to claim 1, wherein the observation region (R) has a polyhedral or spheroidal configuration, the center of the polyhedral or spheroidal region corresponding with the pre-established point (P) of the observation region (R) with respect to which the orientation vector ($\vec{O_j}$) of the optical axes of the plurality of cameras (Cam) are oriented.

12. The method according to claim 1, wherein the at least one positioning mechanism (5) of the calibration solid (3) is configured for positioning the calibration solid at the pre-established point (P) of the observation region (R) with respect to which the orientation vectors ($\vec{O_j}$) of the optical axes of the plurality of cameras (Cam) are oriented.

13. The method according to claim 1, wherein the at least one positioning mechanism (5) of the calibration solid (3) is configured for letting the calibration solid (3) fall due to the action of gravity.

14. The method according to claim 1, wherein the at least one positioning mechanism (5) of the calibration solid (3) is configured for casting the calibration solid (3) from a lower part of the observation region (R).

15. The method according to claim 1, wherein the method further comprises, for each camera ($Cam_j$):
its reorientation;
its repositioning; or
its reorientation and repositioning;
depending on the specific extrinsic calibration parameters, such that the new orientation vector ($\vec{O_j}$) of the optical axes of each camera ($Cam_j$) are oriented towards the pre-established point (P) of the observation region (R).

16. A calibration system for calibrating an object reconstruction device, comprising:
a) a plurality of C cameras (Cam) adapted for image acquisition, a j-th camera of the plurality of cameras (Cam) being identified as $Cam_j$ for all j=1 . . . C, comprising:
a sensor with a sensitive area formed by pixels for capturing an image, and
an optic, with an optical axis with orientation vector ($\vec{O_j}$) for establishing a focus on the sensor and a portion of a space projected on the sensor, and
the plurality of cameras (Cam) being spatially distributed in positions of a closed surface (S) defining an observation region (R) therein, where the cameras (Cam) are configured for having the orientation vector ($\vec{O_j}$) of their optical axes oriented towards a pre-established point (P) of the observation region (R);
characterized in that the object reconstruction device (1) further comprises:
b) a calibration solid comprising a number (NB) of balls (BL), with NB greater than or equal to one, the k-th ball being identified as $BL_k$ for all k=1 . . . NB and wherein if two or more balls are used they have different diameters;

c) at least one positioning mechanism of the calibration solid configured for positioning said calibration solid in the observation region (R);
d) computational equipment in communication with the at least one positioning mechanism and with the plurality of cameras (Cam) and configured for:
  causing in the plurality of cameras (Cam) the capture of images of the observation region (R) when the at least one positioning mechanism positions the calibration solid in said observation region (R), and
  receiving the images acquired by the plurality of cameras (Cam);
wherein the computational equipment is configured to:
  (1) capture data of the object reconstruction device comprising the following sub-steps:
  for each of the cameras ($Cam_j$), provide their intrinsic parameters and estimated values of at least the following extrinsic calibration parameters:

orientation $\overrightarrow{(O_j)}$ in the observation region (R) within the closed surface (S) and
  position of an optical center ($c_j$) being also the point on the optical axis of the optics where all rays passing through it remain unrefracted;
  establish, based on the intrinsic and extrinsic parameters, a bijective correspondence ($f_j$) between each coordinate of a pixel (px) of the image captured by the sensor of the camera ($Cam_j$) and the set of coordinates of the points of the epipolar line (r) of the space, which passes through the optical center ($c_j$) of the camera ($Cam_j$) and are projected by the optic of the camera ($Cam_j$) in that same pixel (px) after the image capture;
  perform a predetermined number (N) of experiments (E), the i-th experiment being identified as $E_i$ for all i=1 ... N, according to the following sub-steps:
    the positioning mechanism positioning the calibration solid in the observation region (R) at a different position;
    activating the plurality of cameras (Cam) for each of them ($Cam_j$) to capture an image of the calibration solid positioned in the observation region (R);
    receiving the images ($I_{ij}$) acquired by the cameras (Cam), where in each image ($I_{ij}$) each of the balls ($BL_k$) captured in the image is shown as connected regions ($BP_k^{ij}$) of pixels, where index i with i=1 ... N denotes the experiment number, index j denotes the camera which has captured the image ($I_{ij}$) with j=1 ... C, and k denotes the ball (BL) from among the balls of the calibration solid with k=1 ... NB,
  (2) post-process the captured data comprising the following sub-steps:
    going through the set of captured images ($I_{ij}$), where for each captured image ($I_{ij}$) the following sub-steps are carried out:
      identify the connected regions ($BP_k^{ij}$) of pixels corresponding to a specific ball ($BL_k$) of the calibration solid, if it appears in the image $I_{ij}$;
      for each connected region ($BP_k^{ij}$) of a ball ($BL_k$) of the calibration solid that does appear in an image ($I_{ij}$), determine:
        a pixel ($px_{ijk}$) corresponding to the center of said connected region ($BP_k^{ij}$) in the image ($I_{ij}$); and
        in the space within the closed surface, determining a normalized direction vector ($d_{ijk}$) of an epipolar line ($r_{ijk}$) which corresponds to the pixel ($px_{ijk}$) through correspondence ($f_j$);
        determine the points of the space ($p_{ik}'$) which minimize the summation of distances to the epipolar lines ($r_{ijk}$) defined by a directions ($d_{ijk}$) of each ball ($BL_k$) in each experiment ($E_i$):

$$p_{ik}' = \left[\sum_{j=1}^{C}[I - d_{ijk}d_{ijk}^T]\right]^{-1} \sum_{j=1}^{C}[I - d_{ijk}d_{ijk}^T]c_j$$

where I is the identity matrix and where T denotes the transposition of the vector $d_{ijk}$;
for each camera ($Cam_j$), determine the extrinsic calibration parameters such that the correspondence ($f_j$) between the epipolar line defined between the center ($c_j$) and the point ($p_{ik}'$), and the pixel ($px_{ijk}$), for any experiment ($E_i$) and for any ball ($BL_k$) is satisfied.

17. A non-transitory computer-readable medium comprising instructions which, when run by a computational equipment, causes the computational equipment to:
(1) capture data of the object reconstruction device comprising the following sub-steps:
  for each of the cameras ($Cam_j$), provide their intrinsic parameters and estimated values of at least the following extrinsic calibration parameters:

orientation $\overrightarrow{(O_j)}$ in the observation region (R) within the closed surface (S) and
  position of an optical center ($c_j$) being also the point on the optical axis of the optics where all rays passing through it remain unrefracted;
  establish, based on the intrinsic and extrinsic parameters, a bijective correspondence ($f_j$) between each coordinate of a pixel (px) of the image captured by the sensor of the camera ($Cam_j$) and the set of coordinates of the points of the epipolar line (r) of the space, which passes through the optical center ($c_j$) of the camera ($Cam_j$) and are projected by the optic of the camera ($Cam_j$) in that same pixel px after the image capture;
  perform a predetermined number (N) of experiments (E), the i-th experiment being identified as $E_i$ for all i=1 ... N, according to the following sub-steps:
    the positioning mechanism positioning the calibration solid in the observation region (R) at a different position;
    activating the plurality of cameras (Cam) for each of them ($Cam_j$) to capture an image of the calibration solid positioned in the observation region (R);
    receiving the images ($I_{ij}$) acquired by the cameras (Cam), where in each image ($I_{ij}$) each of the balls ($BL_k$) captured in the image is shown as connected regions ($BP_k^{ij}$) of pixels, where index i with i=1 ... N denotes the experiment number, index j denotes the camera which has captured the image/i with j=1 ... C, and k denotes the ball (BL) from among the balls of the calibration solid with k=1 ... NB,
(2) post-process the captured data comprising the following sub-steps:
  going through the set of captured images ($I_{ij}$), where for each captured image ($I_{ij}$) the following sub-steps are carried out:

identify the connected regions ($BP_k^{ij}$) of pixels corresponding to a specific ball ($BL_k$) of the calibration solid, if it appears in the image ($I_{ij}$);

for each connected region ($BP_k^{ij}$) of a ball ($BL_k$) of the calibration solid that does appear in an image ($I_{ij}$), determine:

a pixel ($px_{ijk}$) corresponding to the center of said connected region ($BP_k^{ij}$) in the image ($I_{ij}$); and in the space within the closed surface, determining a normalized direction vector ($d_{ijk}$) of an epipolar line ($r_{ijk}$) which corresponds to the pixel ($px_{ijk}$) through correspondence ($f_j$);

determine the points of the space ($p_{ik}'$) which minimize the summation of distances to the epipolar lines ($r_{ijk}$) defined by a directions ($d_{ijk}$) of each ball ($BL_k$) in each experiment ($E_i$):

$$p_{ik}' = \left[\sum_{j=1}^{C}[I - d_{ijk}d_{ijk}^T]\right]^{-1} \sum_{j=1}^{C}[I - d_{ijk}d_{ijk}^T]c_j$$

where I is the identity matrix and where T denotes the transposition of the vector ($d_{ijk}$);

for each camera ($Cam_j$), determine the extrinsic calibration parameters such that the correspondence ($f_j$) between the epipolar line defined between the center ($c_j$) and the point ($p_{ik}'$), and the pixel ($px_{ijk}$), for any experiment ($E_i$) and for any ball ($BL_k$) is satisfied.

* * * * *